United States Patent
Wei et al.

(10) Patent No.: US 11,223,759 B2
(45) Date of Patent: Jan. 11, 2022

(54) EXPOSURE METHOD AND IMAGE SENSING DEVICE USING THE SAME

(71) Applicants: LITE-ON ELECTRONICS (GUANGZHOU) LIMITED, Guangzhou (CN); LITE-ON TECHNOLOGY CORPORATION, Taipei (TW)

(72) Inventors: Shou-Te Wei, Taipei (TW); Wei-Chih Chen, Taipei (TW); Jun-Hao Wu, Taipei (TW)

(73) Assignees: LITE-ON ELECTRONICS (GUANGZHOU) LIMITED; LITE-ON TECHNOLOGY CORPORATION

( * ) Notice: Subject to any disclaimer, the term of this patent is extended or adjusted under 35 U.S.C. 154(b) by 0 days.

(21) Appl. No.: 16/793,850

(22) Filed: Feb. 18, 2020

(65) Prior Publication Data

US 2020/0267322 A1    Aug. 20, 2020

Related U.S. Application Data

(60) Provisional application No. 62/807,246, filed on Feb. 19, 2019.

(30) Foreign Application Priority Data

May 23, 2019   (CN) .......................... 201910435784.3

(51) Int. Cl.
  *H04N 5/232*   (2006.01)
  *G06T 7/00*    (2017.01)
(52) U.S. Cl.
  CPC ......... *H04N 5/232122* (2018.08); *G06T 7/97* (2017.01)

(58) Field of Classification Search
  CPC ............ H04N 5/232122; G01S 7/4915; G01S 7/4918; G01S 17/36; G01S 17/894; G06T 7/60; G06T 7/97
  See application file for complete search history.

(56) References Cited

U.S. PATENT DOCUMENTS

| | | | |
|---|---|---|---|
| 2014/0347516 A1* | 11/2014 | Sano | H04N 5/37455 348/230.1 |
| 2017/0278260 A1* | 9/2017 | Matsui | G06T 5/50 |

(Continued)

FOREIGN PATENT DOCUMENTS

| | | |
|---|---|---|
| CN | 107229056 A | 10/2017 |
| CN | 107765260 A | 3/2018 |

OTHER PUBLICATIONS

Communication corresponding to Chinese Application No. 201910435784.3 and issued by the China National Intellectual Property Administration dated Apr. 1, 2021, 9 pages.

*Primary Examiner* — Hung H Lam
(74) *Attorney, Agent, or Firm* — Innovation Counsel LLP

(57) ABSTRACT

An exposure method and an image sensing device using the same are provided. The exposure method includes the following steps: obtaining a first light-intensity confidence value of each pixel unit based on a first exposure time; obtaining a second light-intensity confidence value of each pixel unit based on a second exposure time, wherein the second light-intensity confidence value is different from the first light-intensity confidence value; and taking the phase difference value, corresponding to one of the light-intensity confidence value and the second light-intensity confidence value of each pixel unit, as an output value of the corresponding pixel unit.

15 Claims, 11 Drawing Sheets

(56) References Cited

U.S. PATENT DOCUMENTS

2017/0289515 A1* 10/2017 Li .................. H04N 13/156
2018/0052231 A1*  2/2018 Cho ................. G01S 7/4816
2019/0033070 A1*  1/2019 Murakami ........... G01S 17/89

* cited by examiner

EXPOSURE METHOD AND IMAGE SENSING DEVICE USING THE SAME

This application claims the benefit of U.S. Provisional application Ser. No. 62/807,246, filed Feb. 19, 2019, and claims the benefit of People's Republic of China application Serial No. 201910435784.3, filed on May 23, 2019, the subject matters of which are incorporated herein by reference.

FIELD OF THE INVENTION

The invention relates to a method and a sensing device using the same, and more particularly to an exposure method and an image sensing device using the same.

BACKGROUND OF THE INVENTION

Conventional image capturing device captures an image of a target and analyzes a distance between the target and the image capturing device through the captured image. For example, the image capturing device emits light to the target, and the light is reflected from the target to pixel unit of the image capturing device, and a difference in the amount of electric storage of the two capacitors of the pixel unit changes. The image capturing device calculates a phase difference value between the signal of the emitted light and the signal of the reflected light according to the difference in the amount of electric storage, and obtains the distance between the target and the image capturing device according to the phase difference value.

However, in the scene, the target may include object in short distance and object in long distance. When exposure time set by the image capturing device is short, the object in short distance shown in the image is clear, but the object in long distance shown in the image is unclear. Conversely, when the exposure time set by the image capturing device is long, the object in long distance shown in the image become clear, but the object in short distance shown in the image are overexposed. Therefore, how to provide a new exposure method is one of the goals of the industry.

SUMMARY OF THE INVENTION

In one embodiment of the invention, an exposure method, for obtaining a number of phase difference values of a number of pixel units of an image sensor, includes the following steps: obtaining a first light-intensity confidence value of each pixel unit based on a first exposure time; obtaining a second light-intensity confidence value of each pixel unit based on a second exposure time, wherein the second light-intensity confidence value is different from the first light-intensity confidence value; and taking the phase difference value, corresponding to one of the light-intensity confidence value and the second light-intensity confidence value of each pixel unit, as an output value of the corresponding pixel unit.

In another embodiment of the invention, an image sensing device is provided. The image sensing device includes an image sensor including a plurality of pixel units, and a controller configured to: obtain a first light-intensity confidence value of each pixel unit based on a first exposure time, obtain a second light-intensity confidence value of each pixel unit based on a second exposure time, wherein the second light-intensity confidence value is different from the first light-intensity confidence value, and take the phase difference value, corresponding to one of the light-intensity confidence value and the second light-intensity confidence value of each pixel unit, as an output value of the corresponding pixel unit.

Numerous objects, features and advantages of the invention will be readily apparent upon a reading of the following detailed description of embodiments of the invention when taken in conjunction with the accompanying drawings. However, the drawings employed herein are for the purpose of descriptions and should not be regarded as limiting.

BRIEF DESCRIPTION OF THE DRAWINGS

The above objects and advantages of the invention will become more readily apparent to those ordinarily skilled in the art after reviewing the following detailed description and accompanying drawings, in which.

DETAILED DESCRIPTION OF PREFERRED EMBODIMENTS

Figure 1A:
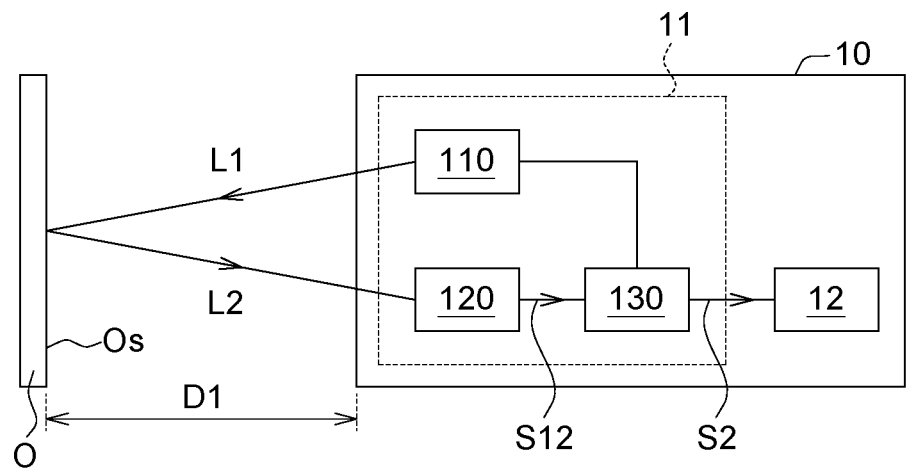
FIG. 1A is a functional block diagram of an electronic device according to a first embodiment of the present invention.
Figure 1B:
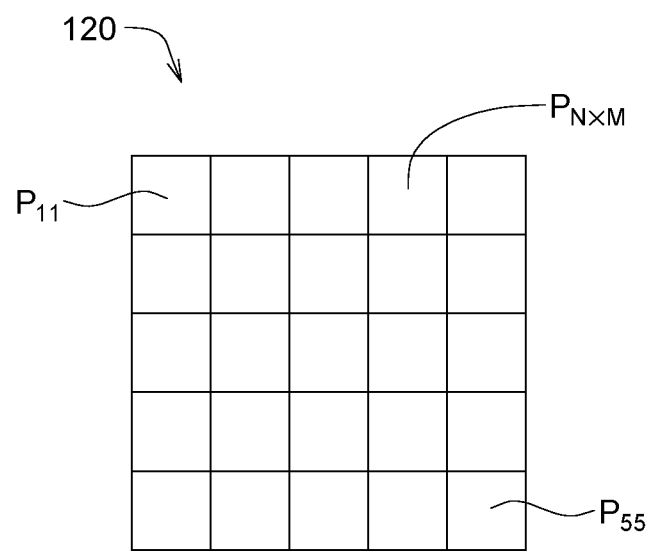
FIG. 1B is a schematic diagram of a number of pixel units of the image sensor of FIG. 1A.
Figure 1C:
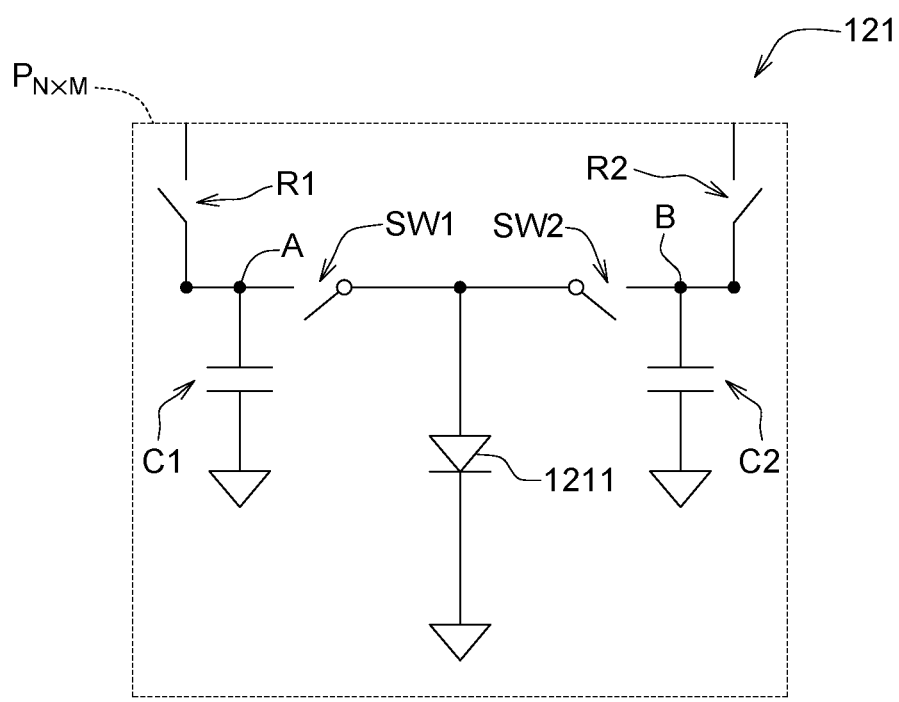
FIG. 1C is a schematic diagram of an exposure circuit of the pixel units of FIG. 1B.
Figure 1D:
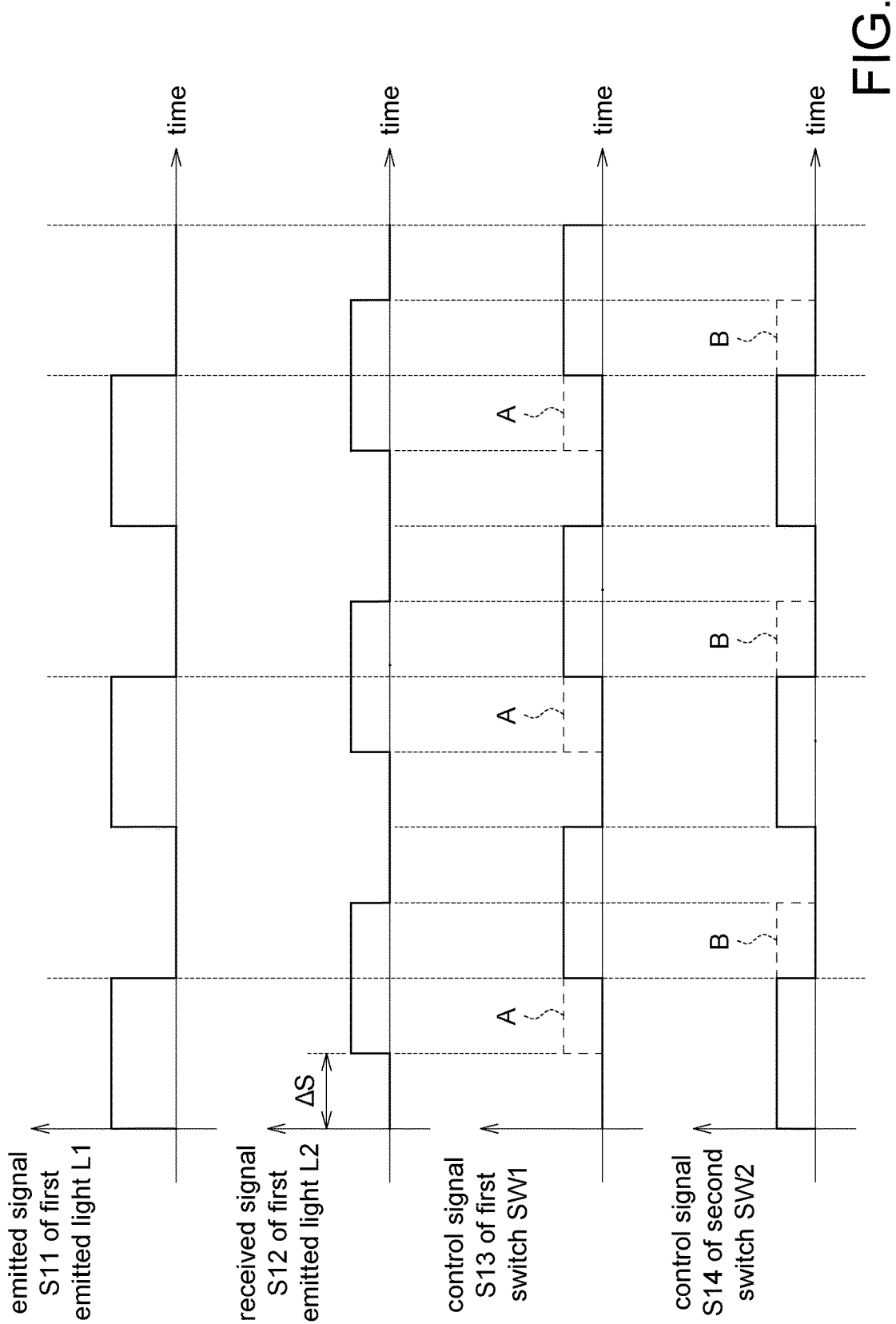
FIG. 1D is a schematic diagram showing the signals of an emitted light and a reflected light of FIG. 1A and the control signals of a first switch and a second switch of FIG. 1C.
Figure 1E:
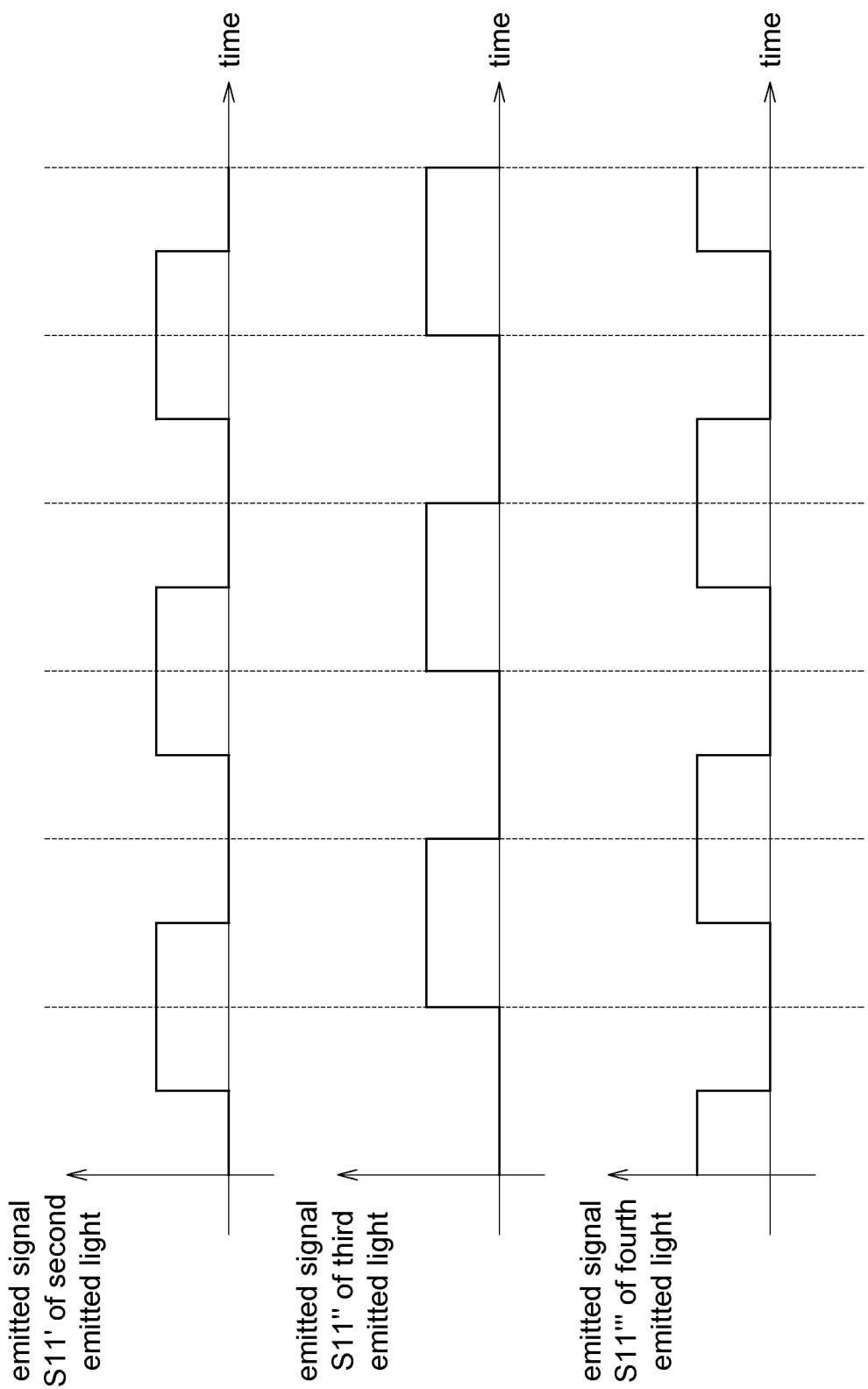
FIG. 1E is a schematic diagram of signals of several emitted light having different phase differences compared to the emitted light of FIG. 1D.

Referring to FIGS. 1A to 1E, FIG. 1A is a functional block diagram of an electronic device 10 according to a first embodiment of the present invention, and FIG. 1B is a schematic diagram of a plurality of pixel units $P_{N \times M}$ of the image sensor 120 of FIG. 1A, FIG. 1O is a schematic diagram of an exposure circuit 121 of the pixel units $P_{N \times M}$ of FIG. 1B, and FIG. 1D is a schematic diagram showing the signals of an emitted light L1 and a reflected light L2 of FIG. 1A and the control signals of a first switch SW1 and a second switch SW2 of FIG. 1C, and FIG. 1E is a schematic diagram of signals of several emitted light having different phase differences compared to the emitted light of FIG. 1D.

The electronic device 10 is, for example, an imaging capturing device, a distance measuring device, or a face recognition device. The electronic device 10 includes an image sensing device 11 and a processor 12. The processor 12 is electrically coupled to the image sensing device 11 and could process the information provided by the image sensing device 11. The image sensing device 11 includes a light source 110, an image sensor 120, and a controller 130. In an embodiment, the image sensor 120 and the controller 130 may be integrated into one piece. The image sensor 120 and/or the controller 130 is, for example, a physical circuit structure formed using a semiconductor process. In an embodiment, the image sensing device 11 is, for example, a time-of-flight (ToF) device.

The light source 110 is, for example, a light-emitting diode (LED) or a laser diode (LD) that could emit light L1 to illuminate the target O, so that an image (or a picture) of the surface $O_S$ of the target O could be captured. In addition, the light L1 is, for example, infrared light, but the embodiment of the present invention is not limited thereto. The light L1 reflected from the target O becomes the reflected light L2, and the reflected light L2 is received by the image sensor 120. The image sensor 120 converts the received reflected light L2 into a received signal S12. The controller 130 could perform corresponding processing and calculation according to the received signal S12 received by the image sensor 120, and generate an output value S2 to the processor 12. The output value S2 is, for example, a phase difference value between the signal of the light L1 and the signal of the light L2, and the processor 12 could obtain the distance between the electronic device 10 and the target O according to the phase difference values.

As illustrated in FIG. 1B, the image sensor 120 includes a plurality of pixel units $P_{N \times M}$, where N and M are any positive integers equal to or greater than 1, and N and M may be equal or different. As illustrated in FIG. 1C, each pixel unit $P_{N \times M}$ includes an exposure circuit 121 that could sense the reflected light L2 to generate the received signal S12. As illustrated in FIG. 1O, any pixel units $P_{N \times M}$ includes a first capacitor C1, a second capacitor C2, a photodiode 1211, switches SW1 and SW2 and switches R1 and R2.

The exposure process of any pixel unit $P_{N \times M}$ based on an exposure time may include the following steps. The switches R1 and R2 are turned on to simultaneously charge the first capacitor C1 and the second capacitor C2. When the first capacitor C1 and the second capacitor C2 are fully charged, the switches R1 and R2 are switched to be turned off. Then, the first switch SW1 and the second switch SW2 could be selectively controlled to be turned on or off alternately. For example, as illustrated in FIG. 1D, the low levels of the control signal S13 and the control signal S14 represent that the switch is in turned-on state, while the high levels of the control signal S13 and the control signal S14 represent that the switch is in turned-off state. In FIG. 1D, the control signal S13 and the control signal S14 have a phase difference of 180 degrees. It can be seen from the complementarity of the control signal S13 and the control signal S14 illustrated in FIG. 1D that the first switch SW1 and the second switch SW2 are turned on or off alternately. As a result, when the photodiode 1211 receives the photon (as the signal S12 illustrated in FIG. 1D, the high level represents that the photodiode 1211 receives the reflected light L2) and the first switch SW1 and the second switch SW2 are turned on alternately, the first capacitor C1 and the second capacitor C2 are alternately discharged.

As illustrated in FIG. 1D, the dashed-line block A represents that the first capacitor C1 is in a discharged state (the photodiode 1211 receives the reflected light L2 and the first switch SW1 is turned on), and the dashed-line block B represents that the second capacitor C2 is in a discharged state. (The photodiode 1211 receives the reflected light L2 and the second switch SW2 is turned on). In other words, the dashed-line block A represents the discharge amount of the first capacitor C1, and the dashed-line block B represents the discharge amount of the second capacitor C2. Therefore, after a period of exposure time, the discharge amount of the first capacitor C1 and the discharge amount of the second capacitor C2 could be obtained according to the changes of the dashed-line blocks A and B. Under the control signals of different phases, the difference (this is equal to the discharge amount) of the electrical storage amount of the first capacitor C1 and the second capacitor C2, such as Image (0°), Image (180°), Image (90°) and Image (270°) could be represented using formulas (1) and (2) below. Image (0°) represents the discharge amount (this is, the difference of the electrical storage amount of the first capacitor C1) of the first capacitor C1 read by the control signal having 0° of phase, Image (180°) represents the discharge amount (this is, the difference of the electrical storage amount of the second capacitor C2) of the second capacitor C2 read by the control signal having 180° of phase, Image (90°) represents the discharge amount (this is, the difference of the electrical storage amount of the first capacitor C1) of the first capacitor C1 read by the control signal having 90° of phase, and Image (270°) represents the discharge amount (this is, the difference of the electrical storage amount of the second capacitor C2) of the second capacitor C2 read by the control signal having 270° of phase. In addition, the definition of "exposure time" here is: for the first capacitor C1, it means that the light-emitted time (Illuminating time) of the light source 110 when the first switch SW1 is in the turned-on state; for the second capacitor C2, it means that the light-emitted time of the light source 110 when the second switch SW2 is in the turned-on state.

The surface $O_S$ of the target O has a stereoscopic (3D) profile, and thus the distances between the corresponding points of the pixel units $P_{N \times M}$ and the surface $O_S$ are not completely equal, and the received signals S12 generated by each pixel unit $P_{N \times M}$ may be different. The processor 12 could obtain an overall three-dimensional contour of the surface $O_S$ of the target O according to the phase difference value corresponding to each pixel unit.

As illustrated in FIG. 1D, the signal S11 represents an emitted signal pattern of the emitted light L1, and the signal S12 represents a received signal pattern of the reflected light L2 received by one of the pixel units, wherein ΔS is the phase difference between the emitted signal S11 and the received signal S12.

In order to increase the accuracy of distance measurements, the light source 110 could provide four light signals L1 having different phase delays, and the distance between the electronic device 10 and the target O could be calculated according to the four received signals S12 of the four reflected light L2. For example, the emitted signal S11 of FIG. 1D is the signal of the first emitted light L1, and the emitted signal S11' of FIG. 1E is the signal of the second emitted light whose phase is delayed by 90 degrees compared to the first emitted light L1, and the emitted signal S11" of FIG. 1E is the signal of the third emitted light L1 whose phase is delayed by 180 degrees compared to the first light L1, and the emitted signal S11''' of FIG. 1E is the signal of the fourth emitted light whose phase is delayed by 270 degrees compared to the first light L1. The four emitted light L1 reflected from the surface $O_S$ of the target O become four reflected light L2, respectively. The four reflected light L2 are reflected to the image sensor 120, and the image sensor 120 converts into four received signals S12 according to the received four reflected light L2 (each reflected light L2 is similar to FIG. 1D, and only the phase difference is different depending on the actual situation). The controller 130 could more accurately calculate the distance between the electronic device 10 and the target O according to the four emitted signals S11 and the four received signals S12.

For example, under an exposure time for exposing the pixel unit (for example, capturing an image), the controller 130 calculates an output value S2 according to the following formulas (1) to (3). The calculations of) Image (0°), Image (90°), Image (180°) and Image (270°) are similar or identical to the above description, and will not be repeated here.

$$I = \text{Image}(0°) - \text{Image}(180°) \tag{1}$$

$$Q = \text{Image}(90°) - \text{Image}(270°) \tag{2}$$

$$S2 = \tan^{-1}(Q/I) \tag{3}$$

The controller 130 transmits the output value S2 according to the formulas (1) to (3) and transmits the output value S2 to the processor 12. The processor 12 calculates the distance between the electronic device 10 and the target O according to the output value S2. The controller 130 calculates a number of distances between the number of the pixel units and a number of different positions of the surface $O_S$ of the object O, according to the above principle and the formulas (1) to (3), for obtaining a stereoscopic contour of the surface $O_S$.

In the present embodiment, the controller 130 further obtains the light-intensity confidence value C of each pixel unit according to the four received signals S12 (the signals of the four reflected light L2). For example, the calculation for the light-intensity confidence value C refers to the following formula (4). It can be seen from the formula (4) that the light-intensity confidence value C is proportional to the light intensity of the reflected light L2. Therefore, the light-intensity confidence value C of each pixel unit based on the current exposure time could be obtained under different exposure times, and the output value S2 of each pixel unit could be determined or selected according to a number of the light-intensity confidence values C.

$$C = (I^2 + Q^2)^{1/2} \tag{4}$$

Figure 2:
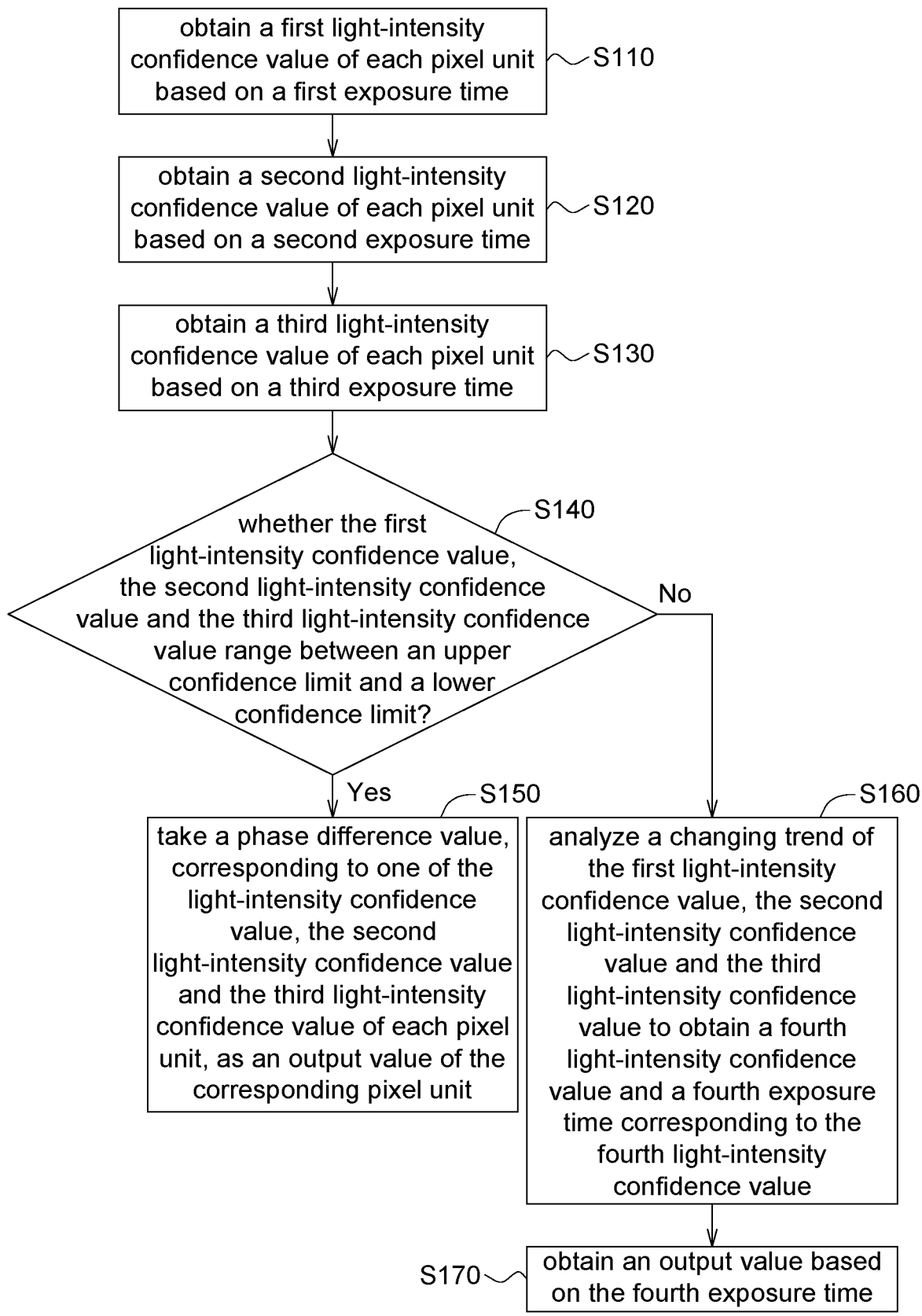
FIG. 2 is a flow chart of an exposure method according to the first embodiment of the present invention.

Referring to FIG. 2, a flow chart of an exposure method according to the first embodiment of the present invention is illustrated. Steps S110 to S170 could be applied to each pixel unit, and the following is exemplified by one pixel unit.

Figure 3A:
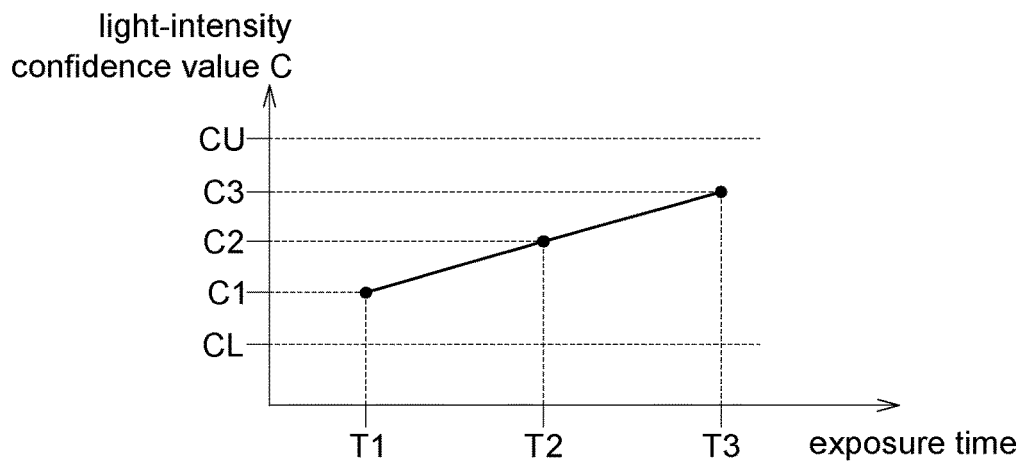
FIG. 3A is a relationship diagram of three light-intensity confidence values for one pixel unit of FIG. 1B respectively obtained under three different exposure times.

In step S110, referring to FIG. 3A, a relationship diagram of three light-intensity confidence values for one pixel unit of FIG. 1B respectively obtained under three different exposure times (capturing three images) is illustrated. In this step, the controller 130 obtains a first light-intensity confidence value C1 of the pixel unit based on the first exposure time T1.

In step S120, as illustrated in FIG. 3A, the controller 130 obtains a second light-intensity confidence value C2 of the pixel unit based on the second exposure time T2, wherein the second exposure time T2 is longer than the first exposure time T1, and the second light-intensity confidence value C2 is different from the first light-intensity confidence value C1.

In step S130, as illustrated in FIG. 3A, the controller 130 obtains the third light-intensity confidence value C3 of the pixel unit based on the third exposure time T3, wherein the third exposure time T3 is longer than the second exposure time T2, and the third light-intensity confidence value C3 is different from the second light-intensity confidence value C2 and the first light-intensity confidence value C1. In an embodiment, for the same pixel unit, the longer the exposure time is, the higher the light-intensity confidence value is. Conversely, the shorter the exposure time is, the lower the light-intensity confidence value is.

In step S140, the controller 130 determines whether the first light-intensity confidence value C1, the second light-intensity confidence value C2, and the third light-intensity confidence value C3 all range between an upper confidence limit CU and a lower confidence limit CL (hereinafter referred to as "a qualified interval"). If so, the process proceeds to step S150; if not, the process proceeds to step S160. Here, the light-intensity confidence value in the qualified interval is called "qualified light-intensity confidence value", and the light-intensity confidence value outside the qualified interval is called "unqualified light-intensity confidence value".

In step S150, as illustrated in FIG. 3A, as the first light-intensity confidence value C1, the second light-intensity confidence value C2 and the third light-intensity confidence value C3 are all qualified light-intensity confidence values, the controller 130 may take the phase difference value corresponding to any one of the first light-intensity confidence value C1, the second light-intensity confidence value C2 and the third light-intensity confidence value C3 as the output value S2 of the pixel unit.

Figure 3B:
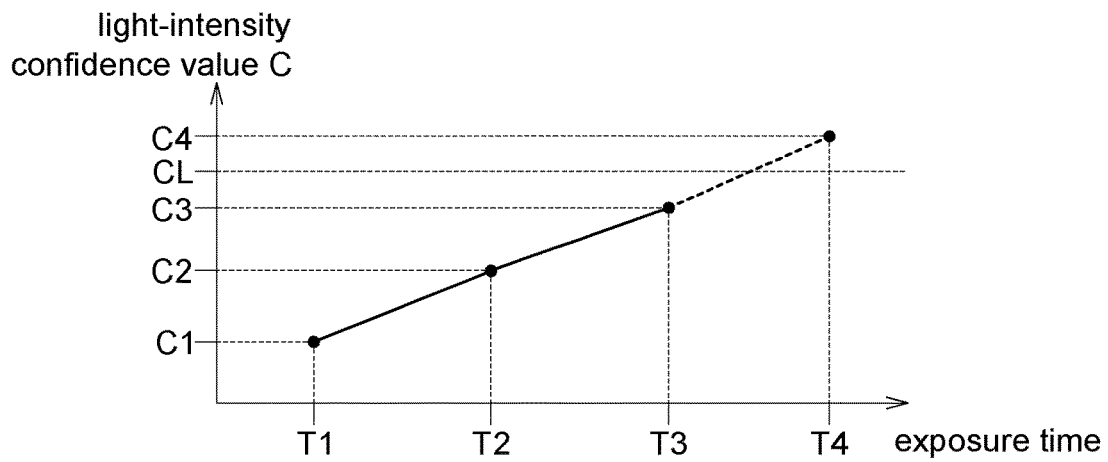
FIG. 3B is another relationship diagram of three light-intensity confidence values for one pixel unit of FIG. 1B respectively obtained under three different exposure times.

In step S160, referring to FIG. 3B, another relationship diagram of three light-intensity confidence values for one pixel unit of FIG. 1B respectively obtained under three different exposure times is illustrated. Different from FIG. 3A, the first light-intensity confidence value C1, the second light-intensity confidence value C2 and the third light-intensity confidence value C3 of FIG. 3B are all lower than the lower confidence limit CL and belong to the unqualified light-intensity confidence values. Therefore, the controller 130 could analyze the changing trend of the first light-intensity confidence value C1, the second light-intensity confidence value C2 and the third light-intensity confidence value C3 by using a suitable mathematical method, such as a linear regression method, to obtain a qualified fourth light-intensity confidence value C4 and the fourth exposure time T4 corresponding to the fourth light-intensity confidence value C4.

Then, in step S170, the controller 130 controls the image sensing device 11 to capture the images of the target O based on the fourth exposure time T4 to obtain the output value S2 of the pixel unit based on the fourth exposure time T4.

Figure 3C:
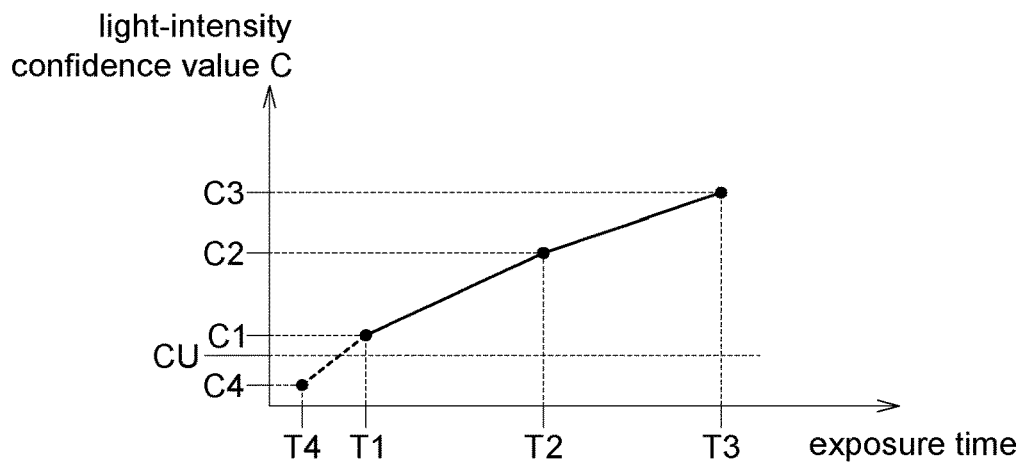
FIG. 3C is another relationship diagram of three light-intensity confidence values for one pixel unit of FIG. 1B respectively obtained under three different exposure times is illustrated.

In step S160 of another embodiment, referring to FIG. 3C, another relationship diagram of three light-intensity confidence values for one pixel unit of FIG. 1B respectively obtained under three different exposure times is illustrated. Different from FIG. 3B, the first light-intensity confidence value C1, the second light-intensity confidence value C2, and the third light-intensity confidence value C3 of FIG. 3C are all higher than the upper confidence limit CU, and belong to the unqualified light-intensity confidence values. Therefore, the controller 130 could analyze the changing trend of the first light-intensity confidence value C1, the second light-intensity confidence value C2 and the third light-intensity confidence value C3 by using a suitable mathematical method, such as a linear regression method, to obtain a qualified fourth light-intensity confidence value C4 and the fourth exposure time T4 corresponding to the fourth light-intensity confidence value C4. Then, in step S170, the controller 130 controls the image sensing device 11 to capture the images of the target O based on the fourth exposure time T4 to obtain the output value S2 based on the fourth exposure time T4.

It can be seen from the foregoing embodiments of FIGS. 3B and 3C, when the pixel unit fails to generate a qualified light-intensity confidence value based on several predetermined exposure times (for example, the first exposure time T1, the second exposure time T2 and the third exposure time T3), the qualified light-intensity confidence value could be obtained by using steps S160 to 170 of FIG. 2.

In addition, in the exposure method of another embodiment, step S130 of FIG. 2 is not required; that is, the output values may be determined according to the two light-intensity confidence values obtained based on two exposure times respectively.

FIGS. 2 to 3C illustrate an example in which the output value S2 of one pixel unit is determined. Next, the process of determining the output values of all the pixel units of the image sensor 120 will be described.

Figure 4:
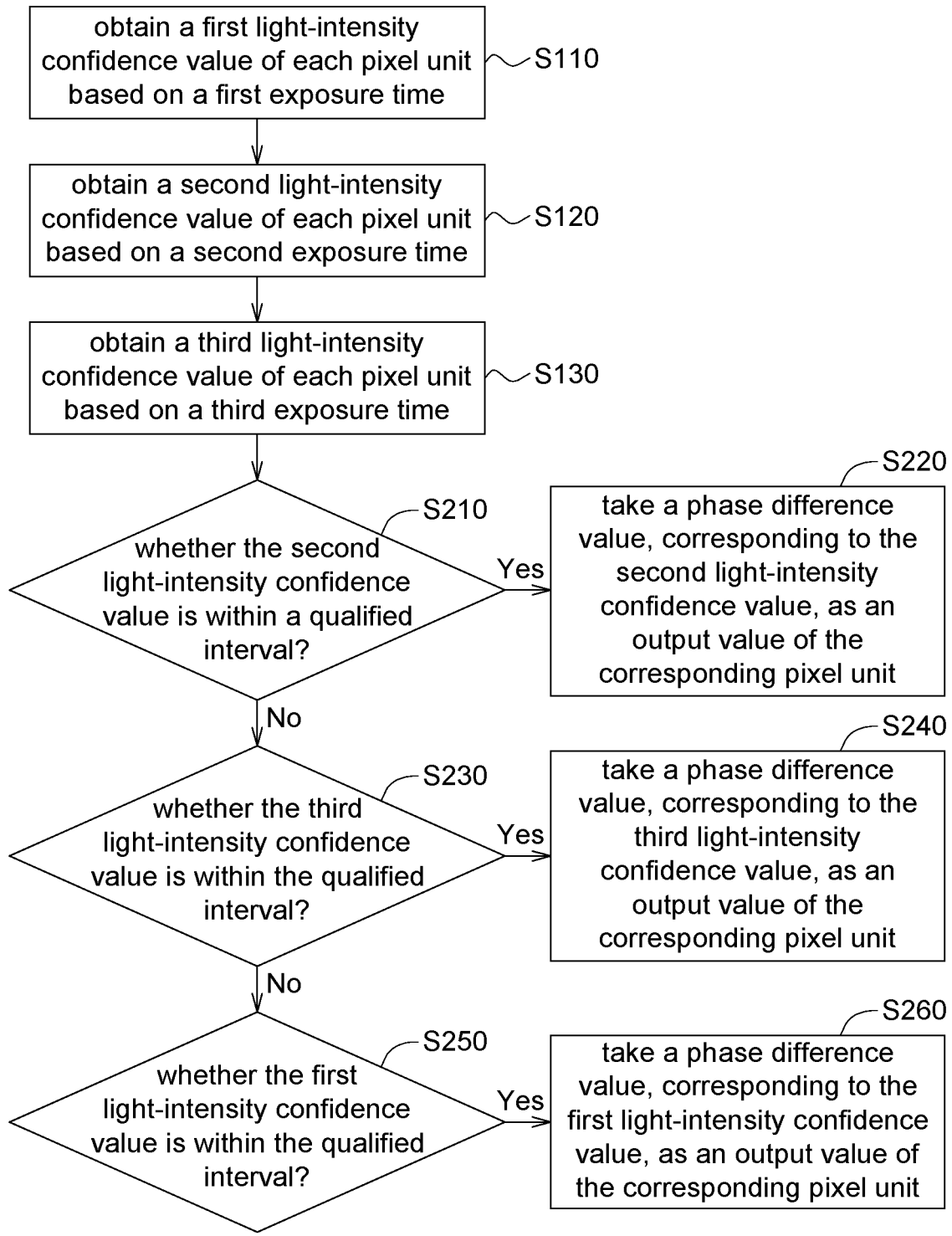
FIG. 4 is a flow chart of determining the output values of all the pixel units of the image sensor according to a second embodiment of the present invention.
Figure 5A:
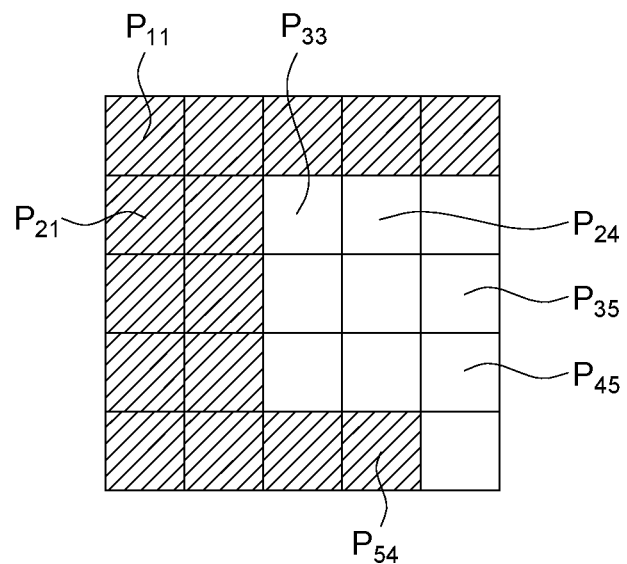
FIGS. 5A to 5B illustrate schematic diagrams of the processes for determining a number of output values of a number of pixel units of an image sensor according to the second embodiment of the present invention.
Figure 5B:
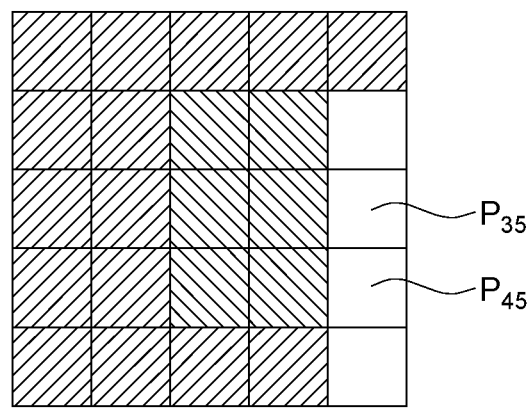

Referring to FIG. 4 and FIGS. 5A to 5B, FIG. 4 is a flow chart of determining the output values of all the pixel units of the image sensor according to a second embodiment of the present invention, and FIGS. 5A to 5B illustrate schematic diagrams of the processes for determining a number of output values S2 of a number of pixel units of an image sensor according to the second embodiment of the present invention.

As illustrated in FIG. 4, the controller 130 obtains three light-intensity confidence values of each pixel unit based on three different exposure times according to steps S110 to S130 as elaborated in FIG. 2. Then, the controller 130 may first remove the unqualified light-intensity confidence value (s) among all the light-intensity confidence values of all the pixel units, wherein the number of qualified light-intensity confidence values retained by each pixel unit may be three, two or one, or there may also be no qualified light-intensity confidence value left.

In step S210 of FIG. 4, for the qualified light-intensity confidence value of each pixel unit, the controller 130 preferentially takes the phase difference value, corresponding to the qualified light-intensity confidence value (for example, the second light-intensity confidence value C2) obtained based on a medium exposure time (for example, the second exposure time T2 of FIG. 3A), as the output value S2 of the pixel unit. For example, the controller 130 determines whether the second light-intensity confidence value C2 is within the qualified interval. If the second light-intensity confidence value C2 is within the qualified interval, the process proceeds to S220; if not, the process proceeds to S230.

In step S220, the controller 130 takes the phase difference value, corresponding to the second light-intensity confidence value C2, as the output value S2 of the corresponding pixel unit. The pixel unit illustrated as hatching in FIG. 5A (such as the pixel units P11, P21, P54, etc.) represent that the pixel units whose second light-intensity confidence values C2 are the qualified light-intensity confidence values, and the pixel units without hatching (for example, the pixel units P33, P24, P35, P45, etc.) represent that the pixel unit whose second light-intensity confidence values C2 are the unqualified light-intensity confidence values.

In step S230, for pixel units without hatching in FIG. 5A, the controller 130 further takes the phase difference value, corresponding to the qualified light-intensity confidence value (for example, the third light-intensity confidence value C3) obtained based on a higher exposure time (for example, the third exposure time T3 of FIG. 3A), as the output value S2 of the pixel unit. For example, as the second light-intensity confidence value C2 is outside the qualified interval, the controller 130 determines whether the third light-intensity confidence value C3 is within the qualified interval. If the third light-intensity confidence value C3 is within the qualified interval, the process proceeds to S240; if not, the process proceeds to S250.

In step S240, the controller 130 takes the phase difference value, corresponding to the third light-intensity confidence value C3, as the output value S2 of the corresponding pixel unit. The pixel unit without hatching in FIG. 5B is the pixel unit whose second light-intensity confidence value C2 and the third light-intensity confidence value C3 are unqualified light-intensity confidence values.

In step S250, for the pixel units without hatching in FIG. 5B (such as pixel units P35, P45, etc.), the controller 130 further takes the phase difference value, corresponding to the qualified light-intensity confidence value (such as the first light-intensity confidence value C1), as the output value S2 of the pixel unit. For example, as the second light-intensity confidence value C2 and the third light-intensity confidence value C3 are outside the qualified interval, the controller 130 determines whether the first light-intensity confidence value C1 is within the qualified interval. If the first light-intensity confidence value C1 is within the qualified interval, the process proceeds to step S260.

In step S260, the controller 130 takes the phase difference value, corresponding to the first light-intensity confidence value C1, as the output value S2 of the corresponding pixel unit.

In step S250, if the first light-intensity confidence value C1 is outside the qualified interval (i.e., the determination result is "No"), it means that the pixel unit cannot generate the qualified light-intensity confidence value under the lower, medium and higher exposure times, the controller 130 may determine the qualified light-intensity confidence value of the pixel unit(s) according to the foregoing S160 and S170 of FIG. 2.

In summary, in an embodiment, for each pixel unit, the controller 130 is configured to: after obtaining the light-intensity confidence value of each pixel unit at the lower, medium and higher exposure times, the qualified light-intensity confidence value is preferentially taken as the output value of the pixel unit based on the medium exposure time; then, for the pixel units that has not yet determined the output value, the qualified light-intensity confidence value is taken as the output value of the pixel unit based on the higher exposure time; then, for the pixel that has not yet determined the output value, the qualified light-intensity confidence value is taken as the output value of the pixel unit based on the low exposure time; then, for the pixel unit (if any) that cannot generate the qualified light-intensity confidence value at the lower, medium and higher exposure times, the controller 130 could determine the qualified light-intensity confidence value of the pixel unit(s) using the steps S160 and S170 of FIG. 2. In addition, the numerical ranges of the higher exposure time, the medium exposure time and the low exposure time are not limited to the embodiment of the present invention.

In another embodiment, for each pixel unit, the controller 130 is configured to: after obtaining the light-intensity confidence value of each pixel unit at the lower, medium and higher exposure times, the qualified light-intensity confidence value is preferentially taken as the output value of the pixel unit based on the higher exposure time; then, for the pixel units that has not yet determined the output value, the qualified light-intensity confidence value is taken as the output value of the pixel unit based on the low exposure time; then, for the pixel unit (if any) that cannot generate the qualified light-intensity confidence value at the higher and lower exposure times, the controller 130 could determine the qualified light-intensity confidence value of the pixel unit(s) using the steps S160 and S170 of FIG. 2. The exposure time corresponding to qualified light-intensity confidence value ranges between the higher exposure time and the lower exposure time belongs to the medium exposure time.

In other embodiments, for each pixel unit, the controller 130 is configured to: after obtaining the light-intensity confidence values of each pixel unit at a number of different exposure times, the qualified light-intensity confidence value, at arbitrary one of a number of different exposure times, preferentially taken as the output value of the pixel unit; then, for the pixel unit that has not yet determined the output value, the qualified light-intensity confidence value, at another one of the different exposure times, taken as the output value of the pixel unit; then, for the pixel unit (if any) that cannot generate the qualified light-intensity confidence value, the controller 130 may determine the qualified light-intensity confidence value of the pixel unit(s) using the steps S160 and S170 of FIG. 2, wherein the qualified light-intensity confidence value may be higher or lower than the light-intensity confidence value at the arbitrary one of the different exposure times, or higher or lower than the light-intensity confidence value at the another one of the different exposure times.

Figure 6:
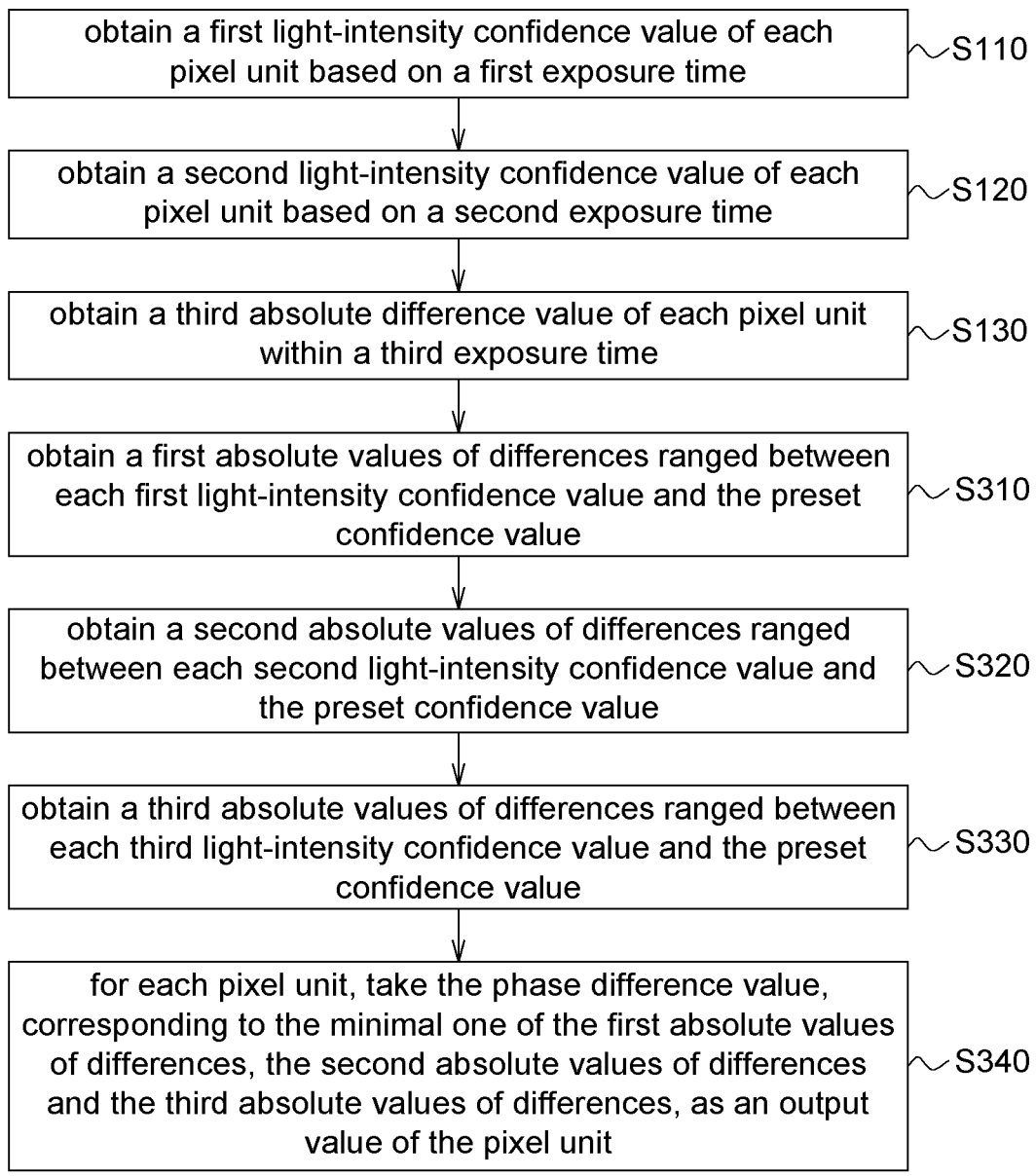
FIG. 6 is a flowchart of determining a number of the output values of a number of pixel units of an image sensor according to another embodiment of the present invention.
Figure 7:
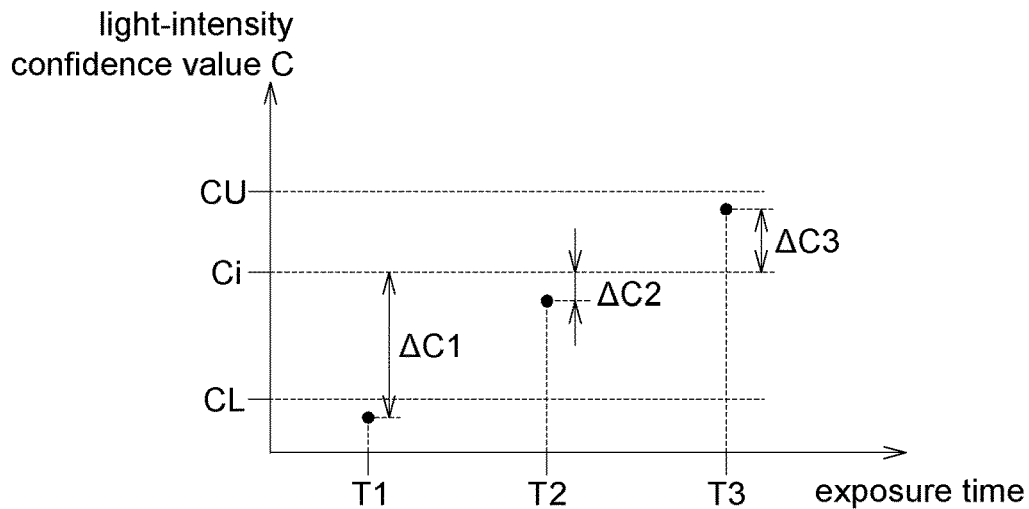
FIG. 7 is another relationship diagram of three light-intensity confidence values for one pixel unit respectively obtained under three different exposure times.

Referring to FIGS. 6 and 7, FIG. 6 is a flowchart of determining a number of the output values S2 of a number of pixel units of an image sensor according to another embodiment of the present invention, and FIG. 7 illustrates another relationship diagram of three light-intensity confidence values for one pixel unit respectively obtained under three different exposure times.

First, as illustrated in FIG. 6, the controller 130 obtains three light-intensity confidence values of each pixel unit at three different exposure times according to steps S110 to S130 of FIG. 2. Then, the controller 130 may preferentially remove the unqualified light-intensity confidence value among all the light-intensity confidence values of all the pixel units, wherein the number of the retained qualified light-intensity confidence values of each pixel unit may be three, two or one, or there may also be no qualified light-intensity confidence value.

In step S310 of FIG. 6, as illustrated in FIG. 7, the controller 130 obtains a first absolute values of differences ΔC1 ranged between each first light-intensity confidence value C1 and the preset confidence value Ci, wherein the preset confidence value Ci is an arbitrary value of the qualified interval ranged between the upper confidence limit CU and the lower confidence limit CL. In addition, the first absolute values of differences ΔC1 is a value obtained by taking its absolute value.

In step S320, as illustrated in FIG. 7, the controller 130 obtains a second absolute values of differences ΔC2 ranged between each second light-intensity confidence value C2 and the preset confidence value Ci. In addition, the second absolute values of differences ΔC2 is a value obtained by taking its absolute value.

In step S330, as illustrated in FIG. 7, the controller 130 obtains a third absolute values of differences ΔC3 ranged between each third light-intensity confidence value C3 and the preset confidence value Ci. In addition, the third absolute values of differences ΔC3 is a value obtained by taking its absolute value.

In step S340, for each pixel unit, the controller 130 takes the phase difference value, corresponding to the minimal one of the first absolute values of differences ΔC1, the second absolute values of differences ΔC2 and the third absolute values of differences ΔC3, as the output value S2 of the pixel unit. For example, as illustrated in FIG. 7, among the first absolute values of differences ΔC1, the second absolute values of differences ΔC2 and the third absolute values of differences ΔC3, the second absolute values of differences ΔC2 is the smallest, and thus the controller 130 takes the phase difference value corresponding to the second absolute values of differences ΔC2 as the output value S2 of the pixel unit.

In the present embodiment, no matter whether the first absolute values of differences ΔC1, the second absolute values of differences ΔC2 and the third absolute values of differences ΔC3 are within the qualified interval, the controller 130 takes the phase difference value, corresponding to the minimal one of the first absolute values of differences ΔC1, the second absolute values of differences ΔC2 and the third absolute values of differences ΔC3, as the output value S2 of the pixel unit.

In another embodiment, the controller 130 only takes the phase difference value, corresponding to the minimal one of a number of the absolute values of differences in the qualified interval, as the output value S2 of the pixel unit. For example, in FIG. 7, due to the second absolute values of differences ΔC2 and the third absolute values of differences ΔC3 being within the qualified interval, only the second absolute values of differences ΔC2 and the third absolute values of differences ΔC3 are considered, while the first absolute values of differences ΔC1 is not considered. In addition, for the pixel unit whose the first absolute values of differences ΔC1, the second absolute values of differences ΔC2 and the third absolute values of differences ΔC3 all being outside the qualified interval, the controller 130 may determine the qualified light-intensity confidence value of this pixel unit by using steps S160 and S170 of FIG. 2. Then, steps S310 to S340 of FIG. 6 are repeated to determine the output value S2 of the pixel unit.

Figure 8:
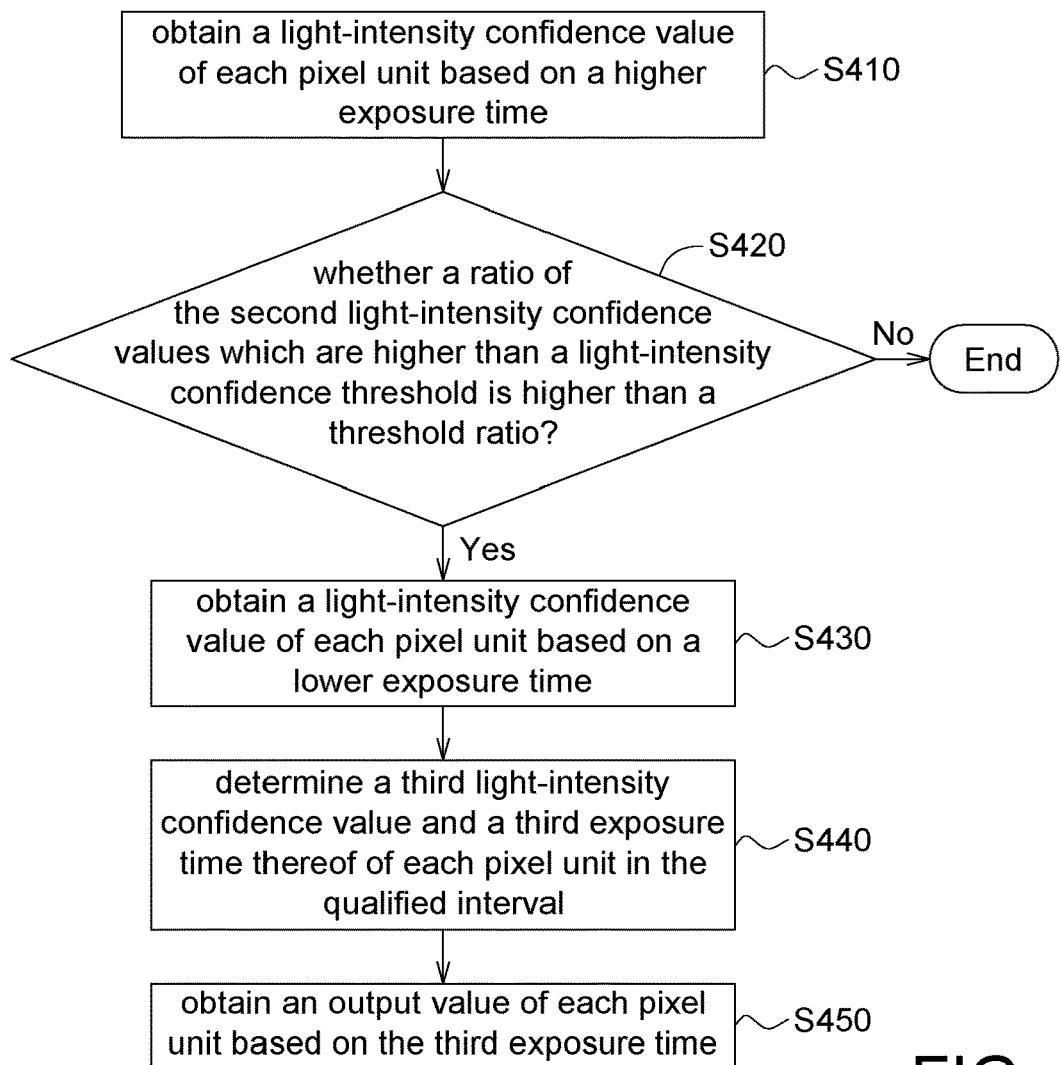
FIG. 8 is a flowchart of determining a number of the output values of a number of the pixel units of an image sensor according to a third embodiment of the present invention.
Figure 9:
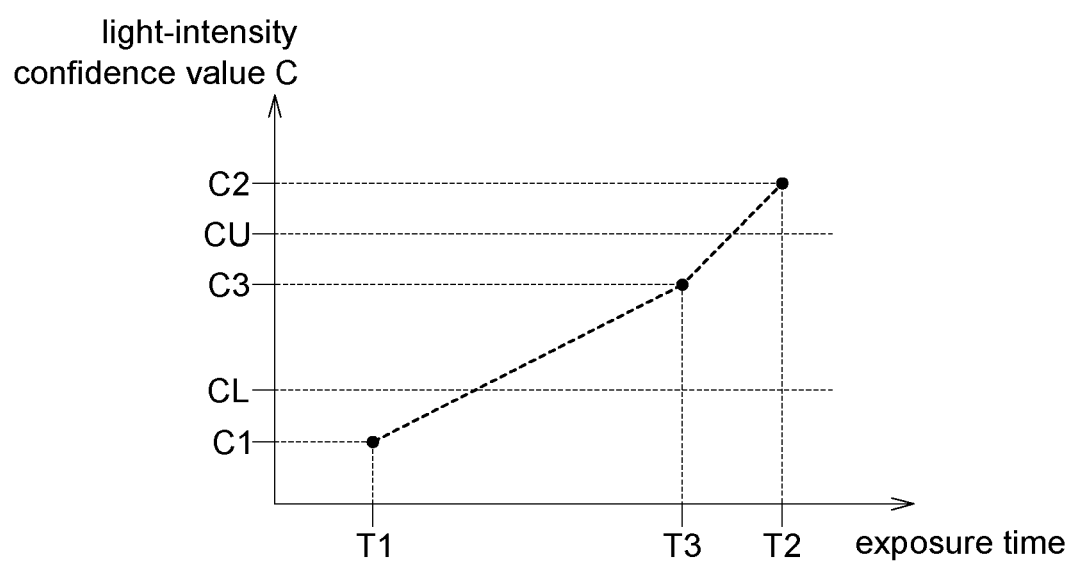
FIG. 9 illustrates relationship diagram of three light-intensity confidence values of the pixel unit under three different exposure times.

Referring to FIGS. 8 and 9. FIG. 8 is a flowchart of determining a number of the output values S2 of a number of the pixel units of an image sensor according to a third embodiment of the present invention, and FIG. 9 illustrates relationship diagram of three light-intensity confidence values of the pixel unit under three different exposure times.

In step S410, the controller 130 obtains the light-intensity confidence value of each pixel unit based on a higher exposure time. For example, as illustrated in FIG. 9, the controller 130 obtains the second light-intensity confidence value C2 of each pixel unit based on the second exposure time T2. The second light-intensity confidence value C2 may be higher than the upper confidence limit CU, lower than the lower confidence limit CL, or within the qualified interval.

In step S420, for all second light-intensity confidence values C2, the controller 130 determines whether a ratio of the second light-intensity confidence values C2 which are higher than a light-intensity confidence threshold is higher than a threshold ratio, wherein the ratio determined by the controller 130 indicates the number of the second light-intensity confidence values C2 which are higher than the light-intensity confidence threshold to the number of all second light-intensity confidence values C2. If the ratio is higher than the threshold ratio, the process proceeds to step S430; if not, the process of the exposure method ends. The aforementioned light-intensity confidence threshold is, for example, the upper confidence limit CU, and the threshold ratio is, for example, 5%, higher or lower.

In step S430, the controller 130 obtains the light-intensity confidence value of each pixel unit based on a lower exposure time. For example, as illustrated in FIG. 9, the controller 130 obtains the first light-intensity confidence value C1 of each pixel unit based on the first exposure time T1, wherein the first exposure time T1 is shorter than the second exposure time T2. In addition, the first light-intensity confidence value C1 may be higher than the upper confidence limit CU, lower than the lower confidence limit CL, or within the qualified interval.

In step S440, the controller 130 may analyze the changing trend of the first light-intensity confidence value C1 and the second light-intensity confidence value C2 by using a suitable mathematical method, such as a linear regression method, and determine the third light-intensity confidence value C3 and the third exposure time T1 thereof of each pixel unit in the qualified interval. In the present embodiment, the light-intensity confidence value C3 is within the qualified interval, or may also be higher than the upper confidence limit CU or lower than the lower confidence limit CL.

In step S450, the controller 130 controls the image sensing device 11 to capture the image of the target O based on the third exposure time T3 to obtain the output value S2 of each pixel unit based on the third exposure time T3.

In summary, a phase difference value of each pixel unit could be obtained based on a single exposure time (e.g., taking one shot of the target). In the embodiments of the present invention, a number of the phase difference values of each pixel unit could be obtained based on a number of the different exposure times (e.g., taking multiple shots of the target), and then one phase difference value is determined (or selected) from these phase difference values, according to the light-intensity confidence value, to represent the suitable phase difference value that is not overexposed or underexposed.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An exposure method, for obtaining a plurality of phase difference values of a plurality of pixel units of an image sensor, comprises:
    obtaining a first light-intensity confidence value of each pixel unit based on a first exposure time;
    obtaining a second light-intensity confidence value of each pixel unit based on a second exposure time, wherein the second light-intensity confidence value is different from the first light-intensity confidence value; and
    taking the phase difference value, corresponding to a smaller difference of the first light-intensity confidence value and the second light-intensity confidence value relative to a preset confidence value of each pixel unit, as an output value of the corresponding pixel unit.

2. The exposure method as claimed in claim 1, wherein the first exposure time is less than the second exposure time, and taking the phase difference value as the output value of the corresponding pixel unit comprises:
    determining whether the second light-intensity confidence value is within a qualified interval of an upper confidence limit and a lower confidence limit;
    if the second light-intensity confidence value is within the qualified interval, taking the phase difference value, corresponding to the second light-intensity confidence value, as the output value of the corresponding pixel unit;
    if the second light-intensity confidence value is outside the qualified interval, determining whether the first light-intensity confidence value is within the qualified interval; and
    if the first light-intensity confidence value is within the qualified interval, taking the phase difference value, corresponding to the first light-intensity confidence value, as the output value of the corresponding pixel unit.

3. The exposure method as claimed in claim 2, wherein taking the phase difference value as the output value of the corresponding pixel unit further comprises:
    if the first light-intensity confidence value and the second light-intensity confidence value do not fall within the qualified interval, obtaining a third light-intensity confidence value of the corresponding pixel unit based on a third exposure time according to a changing trend of the first light-intensity confidence value and the second light-intensity confidence value, wherein the third light-intensity confidence value is within the qualified interval.

4. The exposure method as claimed in claim 1, wherein taking the phase difference value as the output value of the corresponding pixel unit further comprises:
    obtaining a plurality of first absolute values of differences between each first light-intensity confidence value and the preset confidence value;
    obtaining a plurality of second absolute values of differences between each second light-intensity confidence value and the preset confidence value; and
    for each pixel unit, taking the phase difference value, corresponding to the minimal one of the first absolute value of difference and the second absolute value of difference, as the output value of the corresponding pixel unit.

5. The exposure method as claimed in claim 4, wherein taking the phase difference value as the output value of the corresponding pixel unit further comprises:
    when the first absolute value of difference and the second absolute value of difference are within a qualified interval of an upper confidence limit and a lower confidence limit, taking the phase difference value, corresponding to the minimal one of the first absolute value of difference and the second absolute value of difference, as the output value of the corresponding pixel unit.

6. The exposure method as claimed in claim 1, wherein taking the phase difference value as the output value of the corresponding pixel unit further comprises:
  analyzing a changing trend of the first light-intensity confidence value and the second light-intensity confidence value to obtain a third light-intensity confidence value of each pixel unit based on a third exposure time, wherein the third light-intensity confidence value is within the qualified interval.

7. The exposure method as claimed in claim 6, wherein the first exposure time is less than the second exposure time.

8. The exposure method as claimed in claim 6, wherein taking the phase difference value as the output value of the corresponding pixel unit further comprises:
  for the pixel units, determining whether a ratio of the second light-intensity confidence values which are higher than a light-intensity confidence threshold is higher than a threshold ratio; and
  if the ratio is higher than the threshold ratio, performing step of obtaining the first light-intensity confidence value of each pixel unit based on the first exposure time.

9. The exposure method as claimed in claim 6, wherein taking the phase difference value as the output value of the corresponding pixel unit further comprises:
  for the pixel units, determining whether a ratio of the second light-intensity confidence values which are higher than a light-intensity confidence threshold is higher than a threshold ratio; and
  if the ratio is lower than the threshold ratio, stopping execution of the exposure method.

10. An image sensing device comprises:
  an image sensor comprising a plurality of pixel units; and
  a controller configured to:
  obtain a first light-intensity confidence value of each pixel unit based on a first exposure time;
  obtain a second light-intensity confidence value of each pixel unit based on a second exposure time, wherein the second light-intensity confidence value is different from the first light-intensity confidence value; and
  take the phase difference value, corresponding to a smaller difference of the first light-intensity confidence value and the second light-intensity confidence value relative to a preset confidence value of each pixel unit, as an output value of the corresponding pixel unit.

11. The image sensing device as claimed in claim 10, wherein the controller is configured to:
  obtain a third light-intensity confidence value of each pixel unit based on a third exposure time, wherein the first exposure time is less than the second exposure time, and the second exposure time is less than the third exposure time; and
  in taking the phase difference value as the output value of the corresponding pixel unit, the controller is further configured to:
  determine whether the second light-intensity confidence value is within a qualified interval of an upper confidence limit and a lower confidence limit;
  if the second light-intensity confidence value is within the qualified interval, take the phase difference value, corresponding to the second light-intensity confidence value, as the output value of the corresponding pixel unit;
  if the second light-intensity confidence value is outside the qualified interval, determine whether the third light-intensity confidence value is within the qualified interval;
  if the third light-intensity confidence value is within the qualified interval, take the phase difference value, corresponding to the third light-intensity confidence value, as the output value of the corresponding pixel unit;
  if the third light-intensity confidence value is outside the qualified interval, determine whether the first light-intensity confidence value is within the qualified interval; and
  if the first light-intensity confidence value is within the qualified interval, take the phase difference value, corresponding to the first light-intensity confidence value, as the output value of the corresponding pixel unit.

12. The image sensing device as claimed in claim 10, wherein in taking the phase difference value as the output value of the corresponding pixel unit, the controller is configured to:
  obtain a plurality of first absolute values of differences between each first light-intensity confidence value and the preset confidence value;
  obtain a plurality of second absolute values of differences between each second light-intensity confidence value and the preset confidence value; and
  for each pixel unit, take the phase difference value, corresponding to the minimal one of the first value of difference and the second absolute value of difference, as the output value of the corresponding pixel unit.

13. The image sensing device as claimed in claim 12, wherein the controller is further configured to:
  when the first absolute value of difference and the second absolute value of difference are within a qualified interval of an upper confidence limit and a lower confidence limit, take the phase difference value, corresponding to the minimal one of the first value of difference and the second absolute value of difference, as the output value of the corresponding pixel unit.

14. The image sensing device as claimed in claim 10, in taking the phase difference value as the output value of the corresponding pixel unit, the controller is configured to:
  analyze a changing trend of the first light-intensity confidence value and the second light-intensity confidence value to obtain a third light-intensity confidence value of each pixel unit based on a third exposure time, wherein the third light-intensity confidence value is within the qualified interval.

15. An image sensing device comprises:
  an image sensor comprising a plurality of pixel units and being configured to receiving a reflected light; and
  a controller configured to:
  obtain a first light-intensity confidence value of each pixel unit based on a first exposure time;
  obtain a second light-intensity confidence value of each pixel unit based on a second exposure time, wherein the second light-intensity confidence value is different from the first light-intensity confidence value; and
  take a phase difference value, corresponding to one of the first light-intensity confidence value and the second light-intensity confidence value of each pixel unit, as an output value of the corresponding pixel unit;
  wherein the first light-intensity confidence value and the second light-intensity confidence value are respectively obtained according to the reflected light and proportional to a light intensity of the reflected light.

* * * * *